United States Patent [19]

Price

[11] Patent Number: 4,520,719
[45] Date of Patent: Jun. 4, 1985

[54] NUTCRACKER FOR CRACKING HARD-SHELL NUTS SUCH AS BLACK WALNUTS AND MACADAMIA NUTS

[76] Inventor: William M. Price, Rte. 4, Box 226, Wake Forest, N.C. 27587

[21] Appl. No.: 138,183

[22] Filed: Apr. 7, 1980

[51] Int. Cl.³ .............................................. A23B 4/04
[52] U.S. Cl. ..................................... 99/578; 30/120.2
[58] Field of Search ............................ 30/120.2, 120.1; 99/571, 578, 582, 583, 580

[56] References Cited

U.S. PATENT DOCUMENTS

| | | | |
|---|---|---|---|
| 1,037,966 | 9/1912 | Moser | 99/583 |
| 1,049,183 | 12/1912 | White | 99/579 |
| 1,388,071 | 8/1921 | Simons | 99/583 |
| 2,753,906 | 7/1956 | Burchett | 99/579 |
| 3,065,778 | 11/1962 | Harris | 99/583 |
| 3,524,486 | 8/1970 | Turner | 99/571 |
| 3,621,898 | 11/1971 | Turner | 99/571 |
| 3,841,212 | 10/1974 | Powell | 99/571 |

Primary Examiner—James L. Jones, Jr.
Attorney, Agent, or Firm—Mills & Coats

[57] ABSTRACT

The present invention relates to an impact nutcracker of the type having an anvil and an impact member aligned but spaced apart wherein the impact member and anvil are adapted to hold a nut therebetween. A striking device is provided to transmit an impact force to said impact member which transmits the force to the shell of the held nut, causing the same to be cracked and broken such that the kernel can be easily and conveniently removed. The present invention entails an improved impact nutcracker for cracking hard-shell nuts such as black walnuts and macadamia nuts. In order to achieve this, both the impact member and anvil is provided about inner face-to-face end portions with a nut receiving recess that is specifically shaped in a shallow and slightly rounded form to directly engage and surround a substantial portion of the hard-shell nut. This substantial direct engagement of the nut enables the nutcracker to crack the hard-shell nut in a manner that generally leaves the internal kernel mostly unbroken and undisturbed.

2 Claims, 4 Drawing Figures

NUTCRACKER FOR CRACKING HARD-SHELL NUTS SUCH AS BLACK WALNUTS AND MACADAMIA NUTS

FIELD OF INVENTION

The present invention relates to nutcrackers and more particularly to impact nutcrackers of the type which are provided with an impact member and anvil spaced apart and adapted to hold a nut therebetween and which is further provided with a striking member for imparting an impact force to the impact member and causing the nut held between the impact member and anvil to be cracked.

BACKGROUND OF INVENTION

For some time now one of the most practical and efficient nutcrackers has been the so called "Inertia" nutcracker of the type shown in U.S. Pat. No. 3,524,486. This nutcracker has been commercially successful and is generally referred to as an impact type inasmuch as the same is adapted to hold a nut between an impact member and an anvil. A striking member is designed to be cocked and released after which the same drives towards the impact member and strikes the same. This striking force results in a compressive movement between the anvil and impact member, resulting in the nut being cracked.

In an impact nutcracker of the type shown in U.S. Pat. No. 3,524,486, both the anvil and opposed impact member include conically shaped nut receiving recesses. This is important since the design is aimed at providing opposed points of contact about opposite extremities of the nut. This is a very suitable design for relatively soft-shell nuts as pecans, English walnuts or the like. But because the nut receiving recesses are conical shaped, this results in only point or minimum contact of the nut with the recess portions of the impact member and anvil. Point or minimum contact is very effective in cracking nuts such as pecans and English walnuts. But in the case of hard-shell nuts such as black walnuts or macadamia nuts, point or minimal contact is not effective in cracking such nuts with a single blow. At best point contact results in small cracks at the point of contact and consequently some individuals choose to turn the hard-shell nut numerous times resulting in a plurality of small cracks, and continuing this until the shell is sufficiently cracked to remove the kernel. Even in such situations, the kernel may be battered into a great many small pieces, which further hinders the efficiency of the nutcracking operation.

In view of this, there has existed and continues to exist a real need for an impact nutcracker that is capable of cracking hard to crack nuts such as black walnuts and macadamia nuts in the same way that the conventional impact nutcracker has been able to crack pecans and English walnuts.

SUMMARY OF INVENTION

The present invention presents a new and improved impact nutcracker that is specifically designed to efficiently crack hard-shell nuts such as black walnuts and macadamia nuts. Specifically, the present invention entails a novel and unique design for the nut receiving recesses associated with the anvil and impact member of a conventional impact nutcracker. In order to effectively crack these hard-shell nuts such as black walnuts and macadamia nuts, the nut receiving recesses of the anvil and impact member are designed to provide a substantial area of surface contact between the nut being cracked and the receiving recess. This is to be contrasted with the conventional impact nutcrackers which were basically designed to achieve a point contact between the nut and the opposed nut receiving recesses.

In the case of the present invention, the nut receiving recesses associated with opposed end portions of the anvil and impact member are of a generally shallow dish like design that includes a surrounding wall structure that is designed to generally conform with the shape of the nut being cracked and to directly engage a substantial portion thereof. Thus once an impact is directed against the nut held therebetween, the directly engaging substantial surface area of the nut receiving recesses associated with the anvil and the impact member is operative to crack the shell of the nut over a substantial area thereof. This results in the efficient cracking of the shells such that the internal kernel remains in one whole piece or a few relatively large pieces.

One particular feature of the present invention entails an adaptation unit for conventional impact nutcrackers of the type shown in U.S. Pat. No. 3,524,486. In this regard, the present invention presents a second impact member that is adapted to be inserted over the original impact member of the nutcracker, and further this adaptation is provided with a second anvil that replaces the original anvil on the nutcracker. It follows that such a nutcracker with this adaptation unit would be able to crack relatively soft shelled nuts such as pecans and English walnuts as well as hard-shell nuts such as black walnuts and macadamia nuts.

It is, therefore, an object of the present invention to provide an impact nutcracker with means for effectively and efficiently cracking hard-shell nuts such as black walnuts and macadamia nuts.

Still a further object of the present invention resides in the provision of an impact nutcracker of the type having an anvil and an aligned but spaced apart impact member with each being provided with opposed and facing nut receiving recess means for receiving opposite portions of a nut therebetween such that the nut may be held between the anvil and impact member, and wherein the respective nut receiving recess means is designed to surround the nut is such a way that there is substantial surface area contact between the nut receiving recess and the nut such that upon impact the resulting force can be transmitted to a substantial portion of the nut on opposite sides so as to effectuate a cracking action on hard-shell nuts.

Still a further object of the present invention resides in the provision of an adaptation unit for a conventional impact nutcracker of the type shown in U.S. Pat. No. 3,524,486, wherein there is provided a second impact member designed to be inserted over and onto the original impact member, and a second anvil adapted to replace the original anvil, and wherein the respective nut receiving recess means is in the form of that described above so as to effectively and efficiently crack hard-shell nuts.

Another object of the present invention resides in the provision of an improved impact nutcracker that is effective in cracking hard-shell nuts but yet does not smash and/or batter the internal kernel but leaves the same relatively whole or in large chunks and clean.

Other objects and advantages of the present invention will become apparent from a study of the following description and the accompanying drawings which are merely illustrative of the present invention.

DESCRIPTION OF PREFERRED EMBODIMENT

Figure 1:
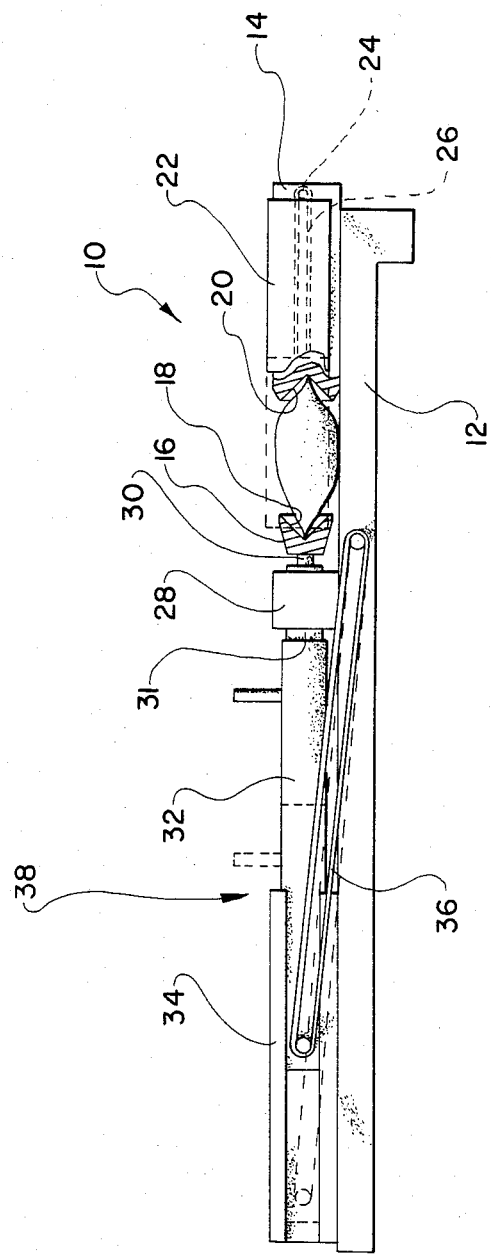
FIG. 1 shows a conventional impact nutcracker.

With further reference to the drawings, an impact type nutcracker is shown therein and indicated generally by the numeral 10. It should be pointed out that nutcracker 10 is of the basic type shown in U.S. Pat. No. 3,524,486, the disclosure of which is expressly incorporated herein by reference.

For a more complete and unified understanding of such an impact nutcracker, a brief description will follow essentially summarizing and discussing the basic components and elements thereof.

In this regard and with further reference to the drawings, the impact nutcracker 10 includes a base 12 and an anvil 14 adapted to be mounted about one end and movable longitudinally thereon for positioning.

A mounting block 28 extends upwardly from base 12 and has movably mounted therein an impact member 16 which faces and is aligned with said anvil 14. Impact member 16 includes an intermediate shaft 30 and a striking head 31. Shaft 30 is confined within an opening in block 28 and is adapted for limited back and forth movement therein.

Returning to anvil 14, the same includes a shield 22 slidably mounted around anvil 14 and normally biased to a retracted position by elastomer or rubber band means 26 that is secured between shield 28 and a stop 24 projecting from the anvil 14.

For providing an impact force, there is provided impact means 38 for selectively striking impact member 16. In this regard, impact means 38 includes a striker 32 confined within a guide assembly 34 mounted to base 12 opposite anvil 14. Striking energy is provided by an elastomer or rubber band means 36 that are tied between spaced apart studs, one stud being secured to striker 32 and another stud projecting from base 12.

Formed about opposed end portions of impact member 16 and anvil 14 are a pair of nut receiving recess means 18 and 20. Nut receiving recess means 18 and 20 are adapted to receive a portion of a nut to be cracked and to support the nut between impact member 16 and anvil 14 prior to and during the cracking operation.

Viewing nut receiving recess means 18 and 20 in more detail, it is seen that the same is basically formed by a conical shaped cavity. This represents the prior art with respect to impact nutcrackers. In conventional impact nutcrackers such as that shown in U.S. Pat. No. 3,524,486, the nut receiving recess means 18 and 20 is particularly shaped such that only a point or minimum area of contact is realized between the recess and shell of the nut being cracked.

Figure 2:
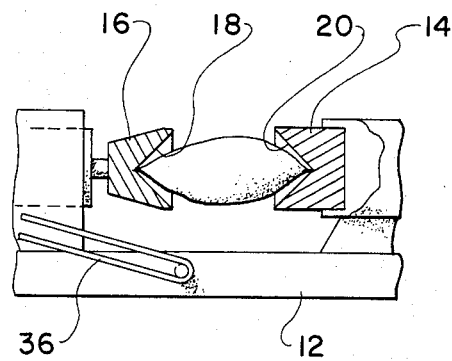
FIG. 2 illustrates the manner in which a pecan is held within a conventional nutcracker.
Figure 3:
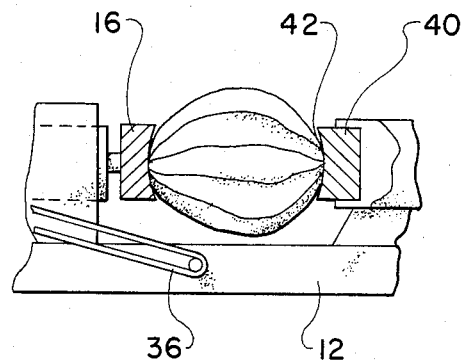
FIG. 3 illustrates the improved impact nutcracker of the present invention.
Figure 4:
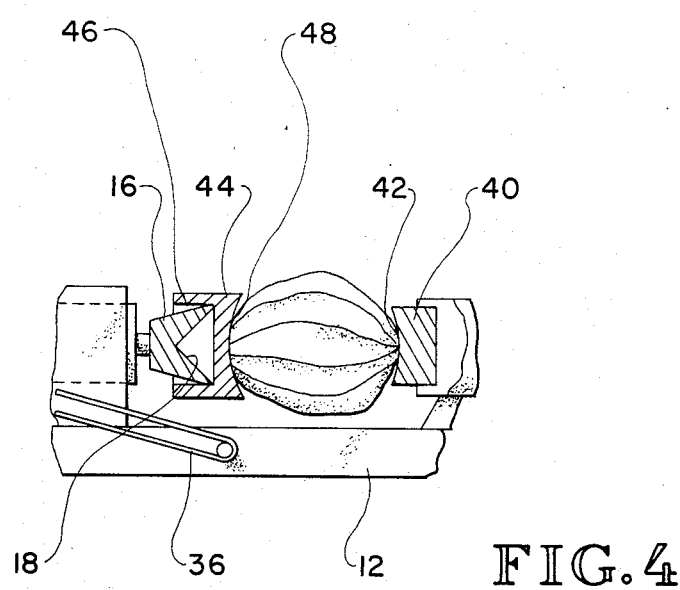
FIG. 4 shows the adaptation unit of the present invention and how it is compatible with a conventional impact nutcracker.

For example, as viewed in FIG. 2, a pecan is shown supported between impact members 16 and anvil 14. It is seen therein that the respective recess means 18 and 20 associated with anvil 14 and impact member 16 is such that these members generally engage opposite end portions of the pecan about opposed pointed ends. Thus there is only point or minimal shell area contact.

As discussed hereinbefore, this is satisfactory for relatively soft-shell nuts such as pecans and English walnuts. But for hard-shell nuts such as that found in black walnuts and macadamia nuts, this point or minimum shell contact area is not satisfactory in cracking such hard-shell nuts.

Turning to the present invention, a second anvil 40 is provided and is adapted to replace anvil 14 on base 12. Second anvil 40 is essentially of the same structure as anvil 14 and as the anvil shown in U.S. Pat. No. 3,524,486 with the exception of the design and shape of the nut receiving recess means. In this regard, anvil 40 includes a nut receiving recess means 42 that is generally shallow in depth and slightly rounded to generally conform to the shape of a round or spherical nut such as a black walnut or macadamia nut. This is to be contrasted with the conical shape of the conventional recess means 18 or 20.

Second anvil 40 could be provided alone with an impact nutcracker for cracking hard-shell nuts or could form the part of an adaptation unit or package for converting conventional impact nutcrackers to a design capable of cracking hard-shell nuts.

As a further part of an adaptation unit, herein disclosed is a second impact member 44 which is adapted to be inserted over the first impact member 16. Second impact member 44 includes a hollow bore 46 that is adapted to fit directly over first impact member 16 such that the same aligns with second anvil 40. In addition, impact member 44 is provided with a nut receiving recess means 48 that is essentially similar to the nut receiving recess means 42 of second anvil 40. To briefly summarize, recess means 48 associated with second impact member 44 is designed so as to be of a generally shallow dish like shape wherein the wall structure forming the same is slightly rounded and shaped so as to conform to the general shape of the nut being cracked.

It follows that receiving recess means 42 and 48 is so designed such that there is substantial surface contact between the wall structure thereof and the nut being cracked such that once an impact force is applied to the respective impact member and associated anvil that a cracking force is transmitted to a substantial part of the shell of the nut. This has been found to be the key to cracking hard-shell nuts such as black walnuts and macadamia nuts.

In this disclosure, the improved nutcracker has been described in the form of an adaptation unit for a conventional impact nutcracker, with the adaptation unit including a second separate and distinct anvil 40 and a second impact member 44 adapted to be inserted over the first impact member 16. As a part of the present invention, however, it is contemplated that the first and original anvil 14 and impact member 16 could be provided with the same type of nut receiving recess means for cracking hard-shell nuts. In such a case it follows that there would be no need for a second impact member 44 as just described.

Briefly reviewing the basic operation of the improved nutcracker of the present invention, to crack a hard-shell nut such as a black walnut or macadamia nut, the same is inserted between anvil 40 and impact member 44 with the nut being directly engaged with the open face portion of the respective nut receiving recess means 42 and 48. Anvil 40 is longitudinally positioned such that the nut is held between impact member 44 and anvil 40. The shield associated with anvil 40 would be pulled across the nut bridging the space between the impact member and anvil so as to generally enclose that area and to prevent shell portions from being shattered therepast.

Next striker 32 is cocked by pulling the same away from block 28 until there is sufficient energy potential realized due to the extension of the elastomer 36. At this point striker 32 is released and is propelled towards block 28 where the same strikes striking head 31. This force is transmitted to the impact member 44 and because of the substantial surface area contact between the respective nut receiving recess means 42 and 48, a substantial portion of the shell of the hard-shell nut is cracked. Then the shield of the anvil is allowed to retract to its normal position and the anvil is moved opposite said impact member and the cracked nut is removed.

In the present invention, the important feature is the actual design of the nut receiving recess means for cavities associated with the anvil and impact member. Because of the specific design that yields substantial surface area contact between the nut and the cavity or recess, substantial area of the shell is engaged and cracked in order that the internal kernel can be removed in whole or in relatively large chunks.

It follows from the foregoing specification that the improved nutcracker of the present invention is advantageous and progresses the state of the art in nutcrackers inasmuch as the same now enables the basic impact nutcracker design to be utilized in cracking hard-shell nuts such as black walnuts and macadamia nuts. It also follows that the present invention is designed to be compatible with the basic impact nutcracker design and in fact, as disclosed herein, an adaptation unit is provided for enabling a conventional impact nutcracker to be altered so as to accommodate hard-shell nuts.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. In a nutcracker of the type having an anvil and an aligned impact member with said anvil and impact member adapted for rectilinear movement relative to each other and further adapted to receive and hold a nut therebetween for cracking; an impact means for striking said impact member and cracking the shell of the nut held between said anvil and impact member in response to said impact means being cocked and released and striking said impact member; the improvement comprising an adaptation unit for cracking hardshelled nuts such as black walnuts and macadamia nuts, said adaptation unit comprising a second impact member having an open hollow center portion for receiving the other impact member such that said second impact member can be easily inserted over the other impact member; said second impact member including a generally flat and shallow, dish-like and slightly rounded nut receiving recess means formed about an end thereof for receiving a hardshelled nut wherein said nut receiving recess means forms a dish-like depression having a nut engaging surface for directly engaging and surrounding a substantial portion of a nut shell such that the nut shell engaged is continuously surrounded about a substantial area by the nut engaging surface of said second impact member; a second anvil adapted to replace said first anvil and to cooperate with said second impact member for cracking a hardshelled nut, said second anvil including a nut receiving recess means shaped as said nut receiving means of said second impact member such that said second anvil is effective to impart a cracking force to a substantial portion of a nut held therebetween.

2. An impact nut cracker having an adaptation unit for cracking hard-shell nuts such as black walnuts and macadamia nuts comprising:

(a) a base support structure;
(b) an anvil adapted to be supported on said base;
(c) a first impact member mounted on said base in alignment with said anvil and spaced therefrom so as to define an area therebetween for receiving a nut where the nut is cooperatively supported by said anvil and said first impact member;
(d) nut receiving recess means provided about the inner end portions of both said anvil and said first impact member for receiving a nut therebetween and supporting the nut about said end portions;
(e) striking means for operatively striking said first impact member so as to impart a cracking force to the shell of a nut held between said impact member and said anvil and wherein said impact nutcracker is provided with said adaptation unit for cracking hard to crack nuts, comprising:

(f) a second insert impact member provided with a central opening therein for receiving said first impact member in such a manner that said second impact member can be inserted thereover;
(g) said second impact member including a generally flat and shallow, dish like and slightly rounded nut receiving recess means formed about the inner end thereof for receiving a hard-shell nut such as a black walnut or macadamia nut, and wherein said nut receiving recess means is sufficiently shallow in depth and specifically rounded so as to directly engage a substantial portion of the nut received therein such that the striking of said first impact member by said striking means results in said second impact member imparting a direct cracking force to a substantial portion of the nut shell engaged within the nut receiving recess means of said second impact member; and
(h) a second anvil adapted to replace said first anvil and to cooperate with said second impact member for cracking a hard to crack nut therebetween, said second anvil including a nut receiving recess means shaped as said nut receiving recess means of said second impact member such that said second anvil is effective to impart a cracking force to a substantial portion of the nut held therein.

* * * * *